United States Patent [19]
Hashimoto

[11] 3,905,839
[45] Sept. 16, 1975

[54] PROCESS FOR PREPARING $Nb_3Sn$ TYPE SUPER-CONDUCTOR COMPOSITE WIRE
[76] Inventor: Yasuo Hashimoto, Fujisawa, Japan
[22] Filed: Feb. 26, 1974
[21] Appl. No.: 445,946
[52] U.S. Cl. .............................................. 29/599
[51] Int. Cl. ..................................... H01L 39/00
[58] Field of Search ........... 148/11.5 R, 34; 29/599; 174/126 CP; 174/DIG. 6

[56]  References Cited
UNITED STATES PATENTS

| | | | |
|---|---|---|---|
| 3,541,680 | 11/1970 | Verrijp | 29/599 |
| 3,623,221 | 11/1971 | Morton et al | 29/599 |
| 3,625,662 | 12/1971 | Roberts et al | 29/599 |
| 3,807,041 | 4/1974 | McDougall | 29/599 |

Primary Examiner—W. Stallard
Attorney, Agent, or Firm—Norman F. Oblon et al.

[57]  ABSTRACT

A $Nb_3Sn$ type super-conductor composite wire is prepared by combining Nb wires and a Sn-Cu alloy wire which are surrounded by Cu to form an intermediate composite, drawing the intermediate composite to contract the sectional area and heat-treating the drawn composite to form the $Nb_3Sn$ type super-conductor composite.

11 Claims, 1 Drawing

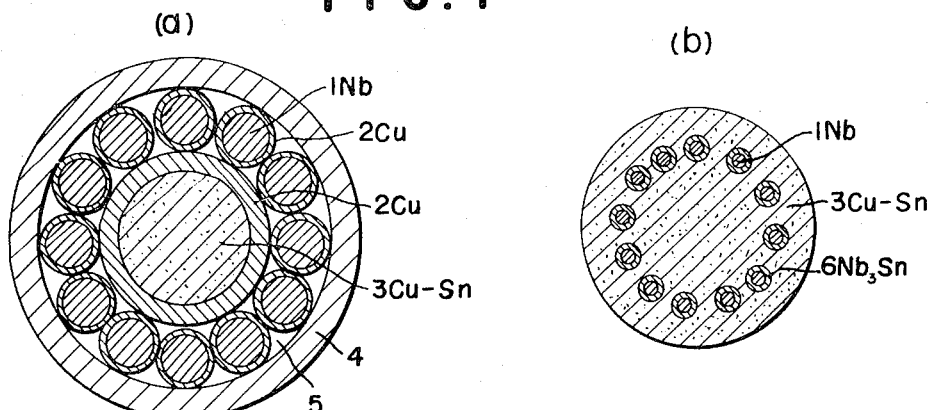
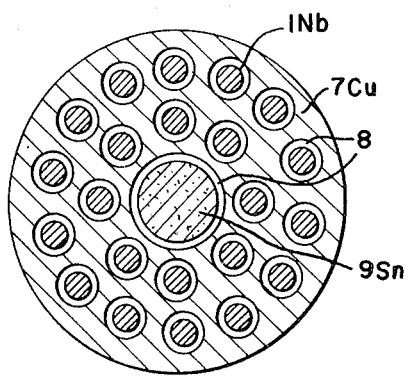
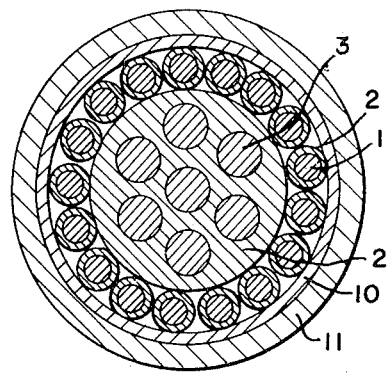
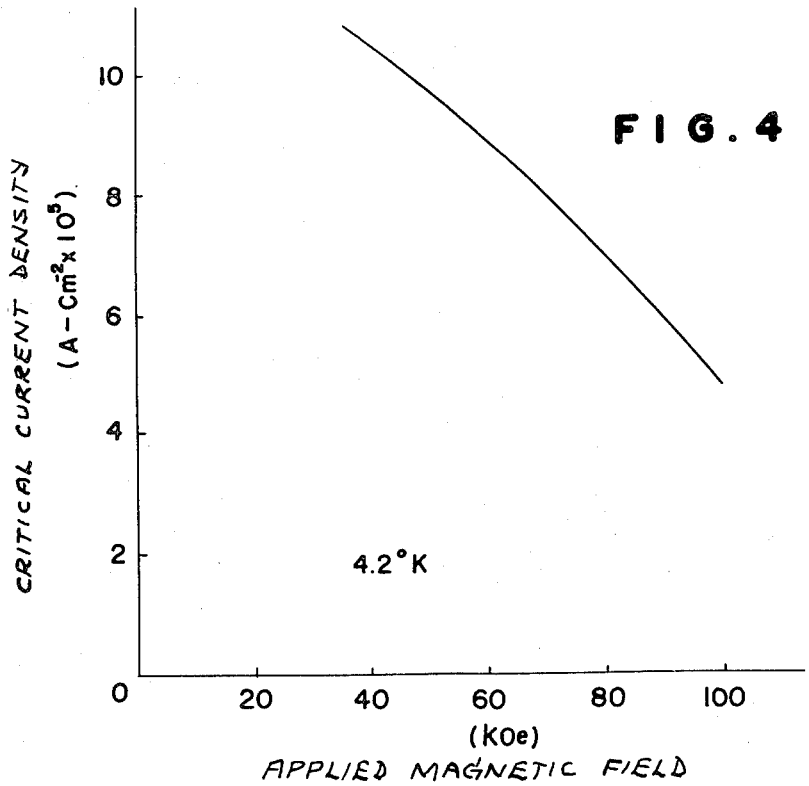

3,905,839

PROCESS FOR PREPARING Nb₃Sn TYPE SUPER-CONDUCTOR COMPOSITE WIRE

BACKGROUND OF THE INVENTION

Field of the Invention

This invention relates to a process for preparing $Nb_3Sn$ type super-conductor composite wires which are characterized by low AC loss and high stabilization.

Description of the Prior Art

Composite super conductor wires having a plurality of fine super-conductor wires which are separated by a conductive material such as Cu are known to possess a high degree of stabilization, and a low AC loss. These types of wires can be formed by twisting a super-conductor composite wire in the axial direction (P. F. Smith, et al, Rutherford Laboratory preprint RBP/A73 1969).

One known alloy type super-conductor composite wire also commercially available is prepared by inserting a desired number of Nb-Ti alloy wires, which are coated with a conductive material, such as Cu into a tube made of Cu, and then drawing the tube and the coated alloy. In some instances, the tube is twisted.

It had been contemplated to prepare super-conductors with $Nb_3Sn$, but such materials are mechanically brittle, so that it is difficult to prepare composite wires therefrom by means which require the material to display a greater degree of plasticity for processing.

In one known process for preparing an $Nb_3Sn$ type super-conductor composite wire, a plurality of Nb rods are arranged in an Nb tube with an equal gap between each rod. Sn is then filled into the space of the gap and then the tube is drawn to a desirable diameter. The drawn product is then heated to react the Nb with the Sn and to form $Nb_3Sn$ core wires. One difficulty with this technique, however, is that Sn is much softer than Nb, so that it is difficult to draw the composite materials as a single body, since the Sn will be so deformed that the connection will often be broken. Moreover, the Nb core wires disadvantageously approach contact with each other in the drawing step.

In another known process, a multi-core wire is prepared by placing Nb into the core of a Cu tube and the multi-core wire is metallized with Sn by continuously passing the wire through a Sn bath. The product is then heated to form $Nb_3Sn$ in the composite wire. Sn diffuses into Cu by the application of heat whereby the Nb cores react with the Sn. Although the drawing operation is easy in this method, the molten metal plating of Sn and the heat treatment for forming $Nb_3Sn$ cannot be carried out in a continuous system. This technique therefore requires that the wire be treated, which is quite industrially disadvantageous, expecially when it is considered that the wire being treated is often several thousand meters in length.

Moreover, Sn is fed from the metallized layer on the outer surface of the multi-core wire so that the Sn feed is small and the amount of the resulting $Nb_3Sn$ formed is also small resulting in a low critical current for the resulting composite wire. These various disadvantages in the conventional processes result in the inability to succeed commercially in the production of a $Nb_3Sn$ type super-conductor composite wire.

A need therefore exists, for a commercially acceptable process for preparing a $Nb_3Sn$ type super-conductor composite wire.

SUMMARY OF THE INVENTION

Accordingly, one object of this invention is to provide a process for preparing a $Nb_3Sn$ type super-conductor composite wire which is characterized by a low AC loss and high stabilization.

Another object of this invention is to eliminate the disadvantages of the conventional process for making superconductor, fine multi-core wires and to prepare a wire in an industrially acceptable manner.

Yet another object of this invention is to produce composite wires which are characterized by a high critical current.

Briefly, these and other objects of the invention, as hereinafter will become apparent are achieved by a process for preparing $Nb_3Sn$ type super-conductor composite wire which comprises uniting Nb wire and Sn-Cu wire which are surrounded by Cu in one body, and drawing the intermediate composite to contract the sectional area and heat-treating the drawn composite wire to cause the Sn to diffuse and react with the Nb to form a $Nb_3Sn$ type super-conductor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1a is a sectional view of the intermediate composite of one embodiment of the invention;

FIG. 1b is a sectional view of the composite wire prepared from the intermediate composite of FIG. 1a;

FIGS. 2 and 3 are respectively sectional views of the intermediate composite of the other embodiments of the invention; and FIG. 4 is a characteristic graph of the critical current density of the super-conductor to the magnetic field.

DETAILED DESCRIPTION OF THE PREFERRED EMBODIMENTS

Cu coated Nb wires are arranged coaxially around a Cu coated Cu-Sn alloy wire to provide a strand. Instead of using a Cu-Sn alloy wire, a Sn wire may be used. However, Cu-Sn alloy is preferred, as it draws easier in the subsequent drawing step. The amount of Cu in the Cu-Sn alloy may be very small.

The number of Nb wires which are arranged coaxially around the Cu-Sn alloy wire may vary depending on the desired characteristics of the superconductor. However, a ratio of Sn-Cu alloy wire to the Nb wire in a range of from 1/8–3, by atomic ratio is desirable. If Sn wire is used, instead of the Cu-Sn alloy wire, then a ratio of Sn wire to Nb wire in the range of 1/9–2, by atomic ratio, should be employed.

After the Cu coated Nb wires are coaxially arranged around the Cu coated Cu-Sn alloy wire, the combination or strand is inserted into a Cu tube to form the intermediate composite. This composite is then drawn to substantially reduce the cross-sectional diameter of the tube. Any voids or spaces present in the composite before drawing are eliminated by the drawing process. As a result of the drawing process, the Nb wires and the Cu-Sn alloy wire, are completely surrounded by Cu.

If desired, the thus drawn wire may be coated with an insulating material which does not react with Cu, such as magnesia or alumina. The coated drawn wire is then heated at 650°–1000°C in an inert atmosphere for several hours. During the heat treatment, the Cu-Sn alloy, or Sn at the center is melted at a temperature lower than 600°C and begins to diffuse into the surrounding Cu. This diffusion occurs uniformly. The formation of $Nb_3Sn$ is initiated by the reaction of the Nb wire with the diffusing Sn at a temperature higher than 650°C. In fact, even when the drawn wire was rapidly heated to 700°C the Sn diffusion was uniform and a uniform layer of $Nb_3Sn$ is formed.

It is important to note, that in accordance with one aspect of the present invention, the raw materials are first drawn, thereby taking advantage of their high ductility, as compared to the lower ductility of the alloy type composite super-conductor wire. This is an unexpected advantage of the present invention.

As a result of the present process, the quality of the $Nb_3Sn$ phase of the composite wire is very high. Moreover, the amount of $Nb_3Sn$ in the composite wire of the invention may be increased to more than 20% of the cross-sectional area by selecting the size (diameter) of the Nb wire coaxially surrounding the Cu-Sn wire, and the size of said Cu-Sn wire thereby increasing the critical current of the composite wire.

It the amount of Sn contained in the Cu-Sn alloy after the reaction to form $Nb_3Sn$ is more than 10 atomic %, it is desirable to maintain the composite wire at 350°–520°C after $Nb_3Sn$ formation so as to provide a stronger wire resulting from the phase transformation of the Cu-Sn alloy on heat aging. This enables the formation of a fine, strong and flexible $Nb_3Sn$ type composite super-conductor wire.

Alternatively, the composite may be formed by providing a plurality of small diameter vertical apertures around a larger diameter vertical aperture in a Cu rod. The small diameter vertical apertures are filled with a plurality of Nb wires and a Sn rod is placed in the large diameter vertical aperture to form the intermediate composite. This composite may then be drawn or twisted prior to heat treatment to form the $Nb_3Sn$ alloy super-conductor. Accordingly, complicated shaped wire articles may be easily formed.

Also, a super-conductive composite having a pure outer layer may be formed by providing a plurality of Nb rods around a Cu-Sn alloy and then inserting this combination into a partitioning metal tube made of a metal through which Sn and Cu will not diffuse. This composite may then be drawn and heat treated. During the heat treatment, the partitioning metal tube will prevent the diffusion of Cu or Sn into any outer conductive layer which is over the partitioning metal tube. The outer layer, beyond the partitioning layer, will, therefore, remain of high purity, and a conductive metal layer having high purity for stabilization may be obtained.

Having generally described the invention, a more complete understanding can be obtained by reference to certain specific examples, which are included for purposes of illustration only and are not intended to be limiting unless otherwise specified.

EXAMPLE 1

Referring now to the drawing, wherein like reference numerals designate identical or corresponding parts throughout, the several views and more particularly to FIG. 1a shows a plurality of Nb rods 1 having a diameter of 2 mm coated with Cu 2, coaxially arranged around a Cu-Sn alloy rod 3 having a diameter of 5.8 mm coated with Cu 2 to provide a strand. The strand is inserted into a Cu tube 4 having an outer diameter of 12 mm and inner diameter of 10 mm.

The intermediate composite is then drawn by a draw-bench and a drawing device to form a composite wire having a diameter of 0.25–0.1 mm. The space 5 is eliminated during the drawing so that the Nb wires 1 and the Cu-Sn alloy wire 3 are surrounded by Cu.

It is possible to substitute the Cu-Sn alloy rod 3 with a Sn rod. However, it is preferable to use a Cu-Sn alloy for the drawing, even though the content of Cu is small.

The composite wire was coated with a fine powder material which is inert to Cu, such as alumina or magnesia, and heated at 650°–1000°C in an inert atmosphere in a batch for several hours. The Sn component in the Cu-Sn alloy was uniformly diffused into Cu to react with the Nb to form the $Nb_3Sn$ layer on the surface of the Nb wires. In the heat treatment step, the Cu-Sn alloy, or Sn placed at the center was melted at lower than 600°C and was diffused into the Cu. The formation of $Nb_3Sn$ was initiated by the reaction of Nb and Sn at higher than 650°C. It is unnecessary to preheat at a low temperature so as to impart uniform diffusion before reacting Nb with Sn to form $Nb_3Sn$. Even though the composite wire was rapidly heated to 700°C, no partial diffusion of Sn or migration seemed to occur and a uniform $Nb_3Sn$ layer is formed.

FIG. 1b shows a sectional view of the composite super-conductive wire prepared by this method, wherein the $Nb_3Sn$ layer 6 is formed on the surface of the Nb wire 1 in the uniform Cu-Sn alloy 3. A $Nb_3Sn$ layer having a thickness of about 7 $\mu$m was formed on the Nb line having a diameter of 20 $\mu$m.

In accordance with the process of this invention, both of the raw materials have high ductility so that the drawing process of the composite was the same or easier than that of an alloy type composite super-conductive wire. The soft Cu-Sn alloy rod 3 was surrounded with Cu 2 and was not directly contacted with the hard Nb 1 and was arranged to be coaxially surrounded by the Nb rods 1. Accordingly, even though the Cu-Sn rod 3 was drawn to several tens $\mu$m, the Cu-Sn wire was not cut. This effect is completely unexpected and it is impossible to obtain in conventional methods.

FIG. 4 is a graph of the critical current density to the vertical applied magnetic field of the composite wire having 12 Nb lines, and the Cu-Sn alloy line 3 consisting of 80 atomic % of Sn which was drawn to outer diameter of 0.1 mm and heated at 700°C for 15 hours.

In comparison with the commercially available $Nb_3Sn$ tape, the critical current density is significantly higher. It is understood that the quality of the $Nb_3Sn$ phase of the composite wire of the invention is remarkably high.

The amount of $Nb_3Sn$ in the composite wire of the invention can be increased to more than 20% in the crosssectional area by preferably selecting the amount of the Nb rod 1 and the Cu-Sn alloy rod 3 (or Sn) in FIG. 1a. The critical current can also be easily increased. When the Cu-Sn alloy of the composite wire after the reaction, that is, the part 3 of FIG. 1b, contains an excess of Sn, e.g. about 10 atomic % of Sn, and the composite wire is maintained at 350°-520°C after the formation of $Nb_3Sn$ so as to increase crystallization of the $\delta$ phase in the $\alpha$-matrix of Cu + Sn alloy, the Cu-Sn alloy was reinforced and the composite wire was reinforced.

In the $Nb_3Sn$ type composite super-conductive wire, it is necessary to form a fine wire, since good flexibility and high strength are required. This requirement can be easily accomplished by the heat treatment for forming $Nb_3Sn$ and the heat treatment for aging. However, it is necessary to adjust the amount of Sn to provide the necessary strength. When the amount of Sn is too high, the Cu-Sn alloy matrix is brittle because of the formation of a large amount of reaction product.

EXAMPLE 2

In another embodiment of the invention, a plurality of vertical apertures in a Cu rod were filled with a plurality of Nb rods and a Sn rod was inserted in the aperture of the Cu rod to form an intermediate composite body. The intermediate composite was heat-treated as set forth in Example 1. FIG. 2 is a sectional view of the intermediate composite (before drawing) in which the Nb rods 1 and the Sn rod 9 were inserted in apertures in the Cu rod 7. It is preferable to pour molten Sn into the apertures while sealing one end of the aperture.

In this embodiment, Cu is in a single structure, and accordingly, a separation of Cu did not occur in the twist processing which was performed to decrease the AC loss, and the Cu layer was stable. The twist processing can be performed before the formation of $Nb_3Sn$ and accordingly, a composite wire having a complicated shape can be easily prepared as a conventional wire alloy.

EXAMPLE 3

FIG. 3 is a sectional view of yet another embodiment of the intermediate composite wherein a plurality of Nb rods 3 covered with Cu 2 were arranged around a Cu-Sn alloy rods 1 coated with Cu 2 and they were inserted in a metallic partition tube 10 made of V, Nb, Ta, Ti or Zr. A conductive metal 11 such as Cu was coated on the tube. The intermediate composite was drawn and heat-treated to prepare the composite superconductive wire.

The formula of Cu-Sn alloy rods 1 was 10–50 atomic % Cu so as to impart higher strength compared to a Sn rod. The ductility of the rod was also improved. The selection of the partition metal tube 10 is to prevent the diffusion of Cu or Sn to the outer conductive metal layer 11 and also to improve durability.

When Nb is used as the partition metal tube 10, $Nb_3Sn$ was formed on the inner surface of the tube, although the diffusion of Sn to the outer conductive metal layer can be prevented. The purity of the conductive metal layer 11 can be maintained, and the composite wire can be usually used.

In accordance with the invention, it is possible to provide twist processing, and also it is possible to coat with a conductive metal having high purity for stabilization.

The composite wires of the above-mentioned three embodiments, can be formed into a twisted strand or can be combined with conductive metal wire made of Cu, Al, Ag or the like whereby a high current can be passed.

The unheat-treated composite wire having no $Nb_3Sn$ was coated with a conventional ceramic type heat resistant insulating material which is widely used. The coated composite wire was wound in the form of a coil and the coil was heated in a furnace to form $Nb_3Sn$ in the composite wire, whereby a super conductive electromagnet can be directly and easily prepared. This aspect of the invention has high economical advantages.

Certain embodiments of the invention have been illustrated referring to Figures. The characteristic features of the invention for the preparation of the $Nb_3Sn$ type composite superconductive wire are as follows:

1. the wire having multi-fine core wires can be easily prepared;
2. the feed of Sn (reactive Component) can be controlled so as to prepare a wire having high critical current;
3. the heat-treatment can be performed in a batch system;
4. the twist processing of the wire is possible to impart low AC loss;
5. the strength of the wire can be increased by the reinforcement of the Cu-Sn alloy;
6. a twisted strand or knitted strand can be prepared by using the wire;
7. a super conductive electromagnet can be economically prepared by winding the wire in the form of a coil and heat-treating the coil.

As a result of the present invention, all of the disadvantages of the conventional process can be eliminated. In the operation of the invention, it is possible to modify the embodiments, such as, by the addition of a nontoxic component, such as Zr, V, or the like to the Nb as a raw material. Other modifications include variation of the number and the placement of Nb rods; the shape of the wire, e.g., to a band shape or a rectangular shape placement of many Cu rods around the Nb rods which surround the Cu-Sn alloy rod the space therebetween being eliminated by the drawing process. All of these modifications are within the spirit and scope of the invention.

It is also possible to form a $Nb_3Ga$, $Nb_3Al$ type super-conductor composite wire by using Ga or Al instead of Sn.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing a $Nb_3Sn$ super-conductor composite wire which comprises uniting into a single structure, a combination of a Nb wire and a Sn containing wire which is surrounded with Cu to form an intermetallic composite, wherein the atomic ratio of the Sn containing wire to the Nb wire is in the range of 1/8–3 when the Sn containing wire is a Sn-Cu alloy wire and 1/9–2 when the Sn containing wire is a Sn wire, wherein said Nb wire is separated from said Sn containing wire by a Cu layer such that said Nb wire and said Sn containing wire are not in mutual contact, drawing said intermetallic composite wire at a temperature of from 650°C to 1000°C, thereby uniformly diffusing the Sn through the Cu to form $Nb_3Sn$ by the reaction of the Nb wire with the diffusing Sn.

2. The process for preparing the $Nb_3Sn$ super-conductor composite wire of claim 1 wherein said Sn containing wire is a Sn wire.

3. The process for preparing the $Nb_3Sn$ super-conductor composite wire of claim 1 wherein said Sn containing wire is a Sn-Cu alloy wire.

4. A process for preparing $Nb_3Sn$ super-conductor composite wire which comprises arranging Nb wires coated with Cu around a Cu-Sn alloy wire coated with Cu, in coaxial relationship and inserting the arranged wires in a tube made of Cu to form an intermediate composite and drawing the intermediate composite to contract the sectional area and then heat-treating the drawn composite wire.

5. The process for preparing the $Nb_3Sn$ type super-conductor composite wire of claim 1 wherein said drawn composite wire is heat-treated in a batch process at 650°–1000°C, in an inert gas atmosphere, for several hours after coating the composite wire with a fine powder of alumina or magnesia which is unreactive with Cu.

6. The process for preparing the $Nb_3Sn$ type super-conductor composite wire of claim 4, wherein the Nb wire has a diameter of about 5.8 mm and the tube made of Cu has an outer diameter of about 12 mm and inner diameter of about 10 mm.

7. The process for preparing the $Nb_3Sn$ type super-conductor composite wire of claim 5 wherein during said heat treatment, the drawn composite wire is rapidly heated to 700°C.

8. The process for preparing the $Nb_3Sn$ type super-conductor composite wire of claim 1 wherein a $Nb_3Sn$ layer of about 7 $\mu$m is formed on a Nb core having a diameter of 20 $\mu$m.

9. The process for preparing the $Nb_3Sn$ type super-conductor composite wire of claim 1 wherein the drawn composite wire has a diameter of about 10 $\mu$m.

10. A process for preparing a $Nb_3Sn$ type super-conductor composite wire which comprises perforating apertures in the longitudinal direction in a rod made of Cu and inserting Nb wire and Sn wire to form a single structure intermediate composite body, drawing the intermediate composite to contract the cross-sectional area, and heat-treating the drawn composite wire.

11. A process for preparing a $Nb_3Sn$ type super-conductor composite wire which comprises inserting Nb wires into a rod made of Cu to form a Nb multi-wire composite, arranging Cu-Sn alloy wires coated with Cu around the Nb multi-wires composite and inserting them into a metal tube, coating the conductive material on the metal tube to form an intermediate composite, drawing the intermediate composite to contract the corss-sectional area and heat-treating the drawn composite wire.

* * * * *

UNITED STATES PATENT AND TRADEMARK OFFICE
CERTIFICATE OF CORRECTION

PATENT NO. : 3,905,839
DATED : September 16, 1975
INVENTOR(S) : Yasuo Hashimoto

It is certified that error appears in the above-identified patent and that said Letters Patent are hereby corrected as shown below:

at [73] insert -- MITSUBISHI DENKI KABUSHIKI KAISHA

Chiyoda-ku, Tokyo, Japan --

Signed and Sealed this

Twenty-sixth Day of October 1976

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,905,839
DATED : September 16, 1975
INVENTOR(S) : Yasuo Hashimoto

It is certified that error appears in the above-identified patent and that said Letters Patent is hereby corrected as shown below:

On page 1, after "Filed: Feb. 26, 1974", insert a new field:

--[30]      Foreign Application Priority Data
    Feb. 27, 1973 [JP]    Japan..........23503/1973--

Signed and Sealed this

Seventeenth Day of December 1985

[SEAL]

Attest:

DONALD J. QUIGG

Attesting Officer     Commissioner of Patents and Trademarks